United States Patent [19]
Kim

[11] Patent Number: 6,040,874
[45] Date of Patent: Mar. 21, 2000

[54] PERIPHERAL UNIT CONNECTION STATUS DISPLAY DEVICE OF COMPOSITE VIDEO APPARATUS AND METHODS THEREOF

[75] Inventor: Jin-Bog Kim, Suwon, Rep. of Korea

[73] Assignee: Samsung Electronics Co., Ltd, Rep. of Korea

[21] Appl. No.: 09/065,710

[22] Filed: Apr. 24, 1998

[30] Foreign Application Priority Data

Apr. 29, 1997 [KR] Rep. of Korea ............... 97-16042

[51] Int. Cl.⁷ .................................... H04N 5/50
[52] U.S. Cl. ............... 348/569; 348/705; 348/552
[58] Field of Search ....................... 348/569, 570, 348/552, 553, 563, 564, 589, 600, 705, 706, 722; H04N 5/50, 5/445, 7/00, 5/44, 5/268, 5/222

[56] References Cited

U.S. PATENT DOCUMENTS 4,337,480 6/1982 Bourassin .......................... 348/552
5,402,183 3/1995 Tanaka ............................... 348/705

Primary Examiner—Sherrie Hsia
Attorney, Agent, or Firm—Dilworth & Barrese

[57] ABSTRACT

The present invention relates to a peripheral unit connection status display device of a composite video instrument and methods thereof which is capable of displaying the connection status between peripheral units and a plurality of input and output lines provided to a television set when a user selects a mode for displaying the connection status. The peripheral unit connection status display device in a composite video instrument can include a system controller for outputting a control signal to operate peripheral units in response to a user selection of a mode for displaying the connection status of the peripheral unit and at the same time, for outputting a control signal to generate a character according to the determination results about what a peripheral unit is connected to a television system. A switching unit selects a signal among various signals from the peripheral units connected to the television system in response to the control signal from the system controller. An on screen display (OSD) generating unit operates in response to the control signal for generating a character output from the system controller in order to display the connection status of the peripheral units to the television system.

7 Claims, 4 Drawing Sheets

PRIOR ART

PERIPHERAL UNIT CONNECTION STATUS DISPLAY DEVICE OF COMPOSITE VIDEO APPARATUS AND METHODS THEREOF

BACKGROUND OF THE INVENTION

1. Field of the Invention

The present invention relates to a peripheral unit connection status display device of a composite video apparatus and methods thereof which is capable of displaying the connection status between peripheral units and a plurality of input and output lines provided to a television set when a user selects a mode for displaying the connection status.

2. Prior Art

In general, a television set demodulates a broadcast signal received from a broadcasting station to generate video signals and audio signals. The video signals are displayed on a cathode ray tube (CRT) and the audio signals are outputted through a speaker.

These days, techniques have been developed for the television to provide video signals and audio signals from other reproducing devices, such as video cassette recorders, laser disc players and graphic compact disc players (DVD) to the user. In other words, generally composite video apparatuses are being used .

FIG. 1 is a schematic block diagram for a television system.

Reference numeral 5 denotes a tuner which selects a predetermined broadcast signal from various broadcast signals received through an antenna under the control of a system controller 2. An intermediate frequency (IF) amplifying unit 6 serves to amplify an intermediate frequency output from the tuner 5.

A P/S separation unit 7 separates the intermediate frequency from the amplifying unit 6 into a video intermediate frequency signal and an audio intermediate frequency signal. The P/S separation unit 7 is a surface elastic wave filter.

An audio detection unit 8 detects an audio signal from the audio intermediate frequency signal, and a video detection unit 11 detects a video signal from the video intermediate frequency signal.

Reference numeral 1 denotes a remote controller for executing various functions, such as selecting a channel or converting a mode. Reference numeral 3 denotes a signal receiving unit for converting infrared rays received from remote controller 1 into an electric code signal. System controller 2 controls the television system according to signals received from the remote controller 1. Channel memory 4 is coupled to system controller 2 and stores predetermined channel data.

An audio processing unit 9 processes audio signals such as base, treble and volume under the control of the system controller 2. A video processing unit 12 processes video signals, such as color, tint and brightness, output from the video detection unit 11 to output red, green and blue signals according to a control signal of the system controller 2. Furthermore, a mixer unit 14 serves to mix RGB signal output from the video processing unit 12 and RGB signal and OSD blacking signal Y' output from an on screen display (OSD) generating unit 13.

A CRT driving unit 15 drives a CRT according to RGB signal output from the mixer 14.

The television system having the above-construction is manipulated by using the remote controller 1 or a data input unit (not described) so that the system controller 2 controls peripheral units to display a program belonging to a channel, which is selected by the user, on the CRT.

To display the program or signals being output from peripheral units such as a video apparatus, a cable converter or a satellite receiver, the peripheral units must be connected to predetermined terminals. Otherwise, the peripheral units do not operate.

SUMMARY OF THE INVENTION

It is an object of the present invention to provide a peripheral unit connection status display device of a composite video apparatus and methods thereof which is capable of displaying the connection status between peripheral units and a plurality of input and output lines provided to a television set when a user selects a mode for displaying the connection status.

To achieve the above object, the present invention provides a peripheral unit connection status display device of a composite video apparatus comprising: a system controller for outputting a control signal to operate peripheral units when a user selects a mode for displaying a connection status of the peripheral units and at the same time, for outputting a control signal to generate a character according to determination result about what peripheral unit is connected to a television system; a switching unit for selecting a signal among various signals from the peripheral units connected to the television system according to a control signal from the system controller; and an OSD generating unit operating according to the control signal for generating a character from the system controller in order to display the connection status of the peripheral units to the television system.

Furthermore, the present invention provides a method for displaying the peripheral unit connection status of a composite video apparatus comprising the steps of: operating a peripheral unit connected to a television system for a predetermined time when a mode for displaying the connection status is selected; selecting a signal being output from the peripheral unit; determining whether the peripheral unit is connected to the television system by detecting a synchronous signal for signals output from the peripheral unit; and displaying the peripheral unit connected to the television system on a monitor in order for a user to acknowledge.

BRIEF DESCRIPTION OF THE DRAWINGS

The above abject, and other features and advantages of the present invention will become more apparent by describing in detail preferred embodiments thereof with reference to the attached drawings, in which.

DETAILED DESCRIPTION OF PREFERRED EMBODIMENTS

Figure 1:
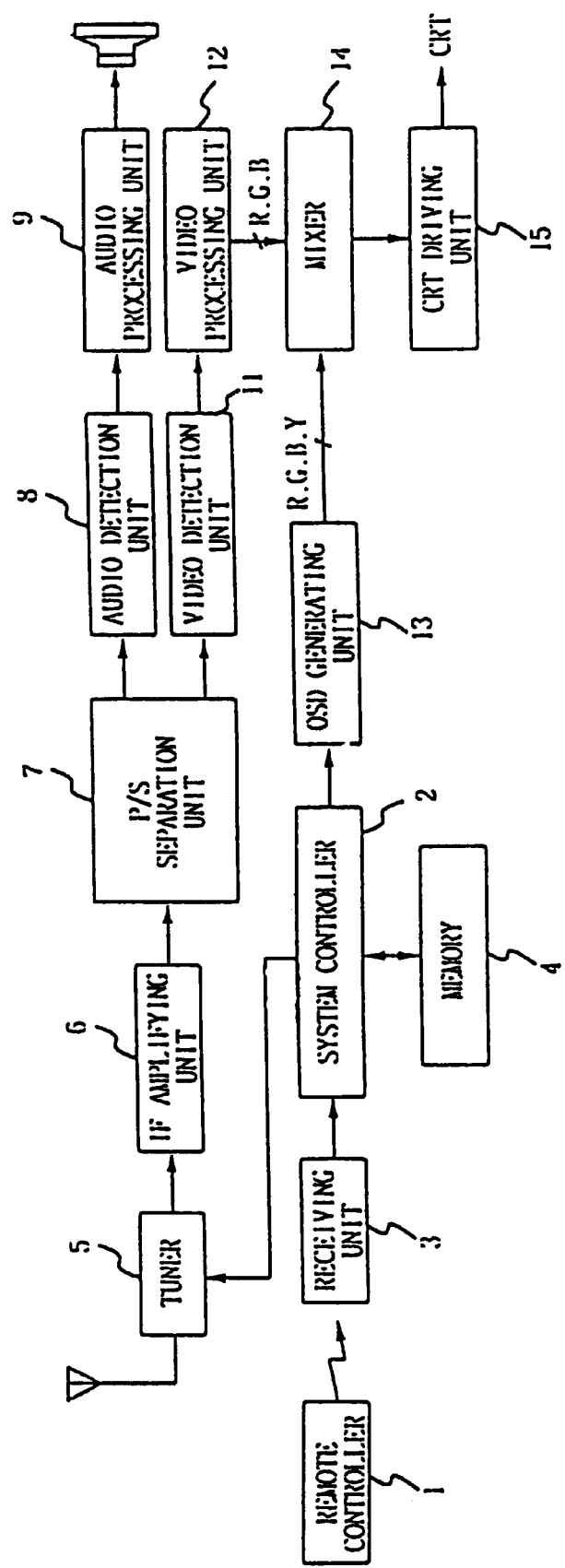
FIG. 1 is a block diagram of a conventional television system.
Figure 2:
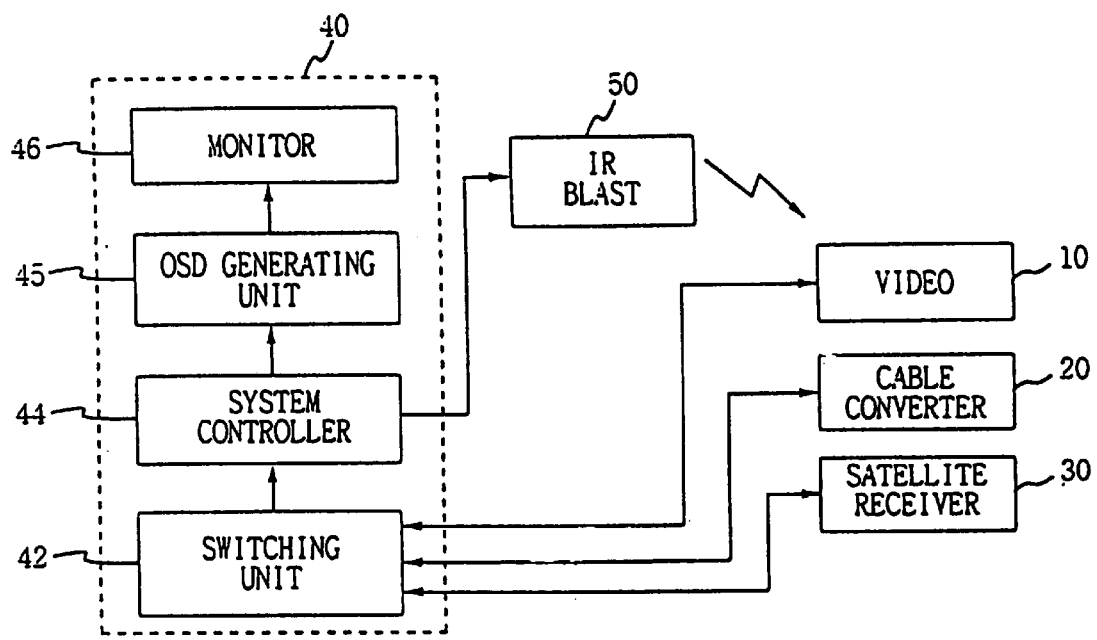
FIG. 2 is a block diagram illustrating a peripheral unit connection status display device of a composite video apparatus according to an embodiment of the present invention.
Figure 3:
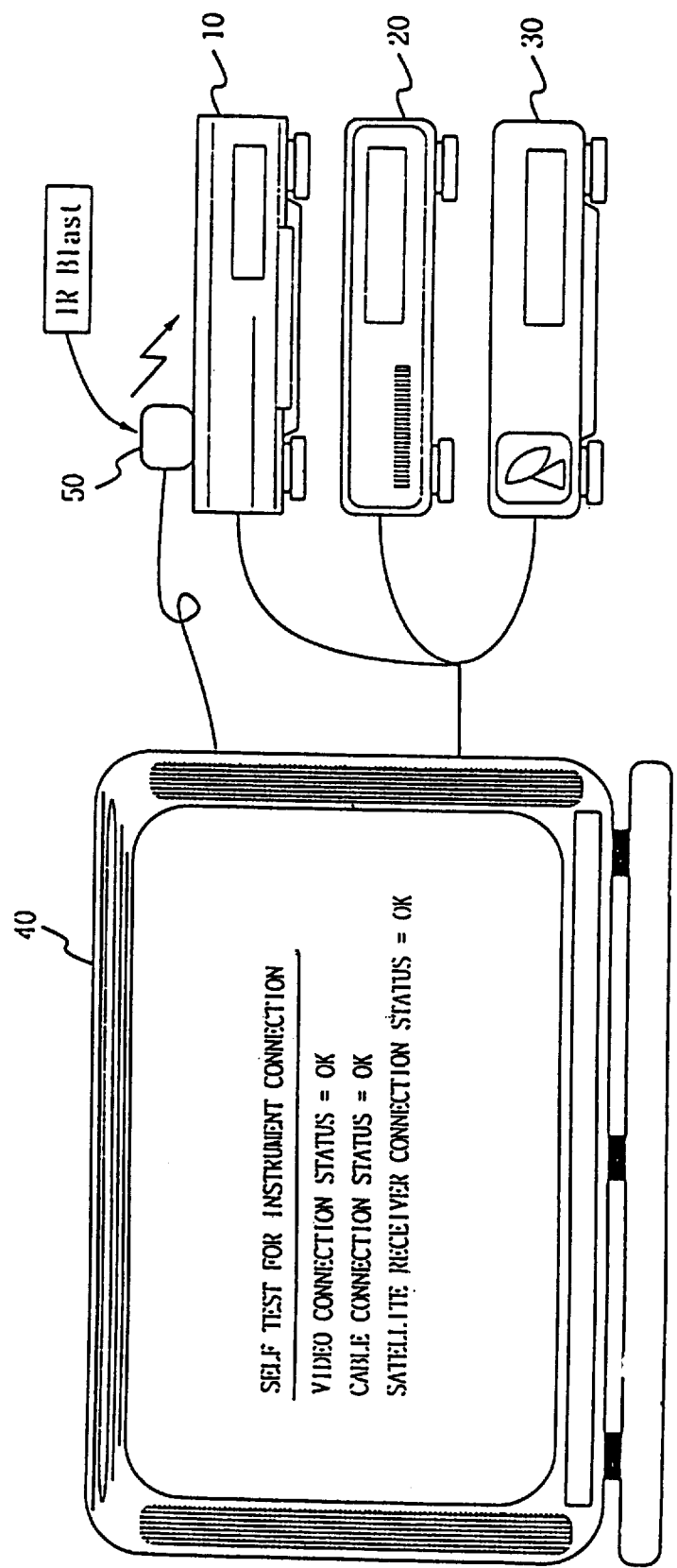
FIG. 3 is an example view illustrating the operation status according to the present invention.

FIG. 2 is a block diagram illustrating a peripheral units connection status display device of a composite video apparatus according to the present invention, and FIG. 3 is an example view illustrating an operation status according to the present invention.

In FIGS. 2 and 3, a peripheral unit connection status display device 40 according to the present invention includes a system controller 44. The system controller 44 outputs a control signal for operating peripheral units when a user selects a mode for displaying a connection status. The system controller 44 also determines whether the peripheral unit is connected to the television system by detecting a synchronous signal among output signals from the peripheral units to output a control signal.

The device also includes a switching unit 42 and an OSD generating unit 45. The switching unit 42 selects a signal among various signals from the peripheral units connected to the television system in response to the control signal output from the system controller 44. The selected signal is then provided to the system controller 44.

The OSD generating unit 45 operates in response to a control signal for generating a character output from the system controller 44 to display the status of peripheral units connected to the television system on a monitor 46. System controller 44 provides the control signal to the peripheral units 10, 20, 30, via an infrared (IR) transmission 50. Other methods of transmitting the control signal to the peripheral units may also be employed (e.g., radio frequency, etc.).

Figure 4:
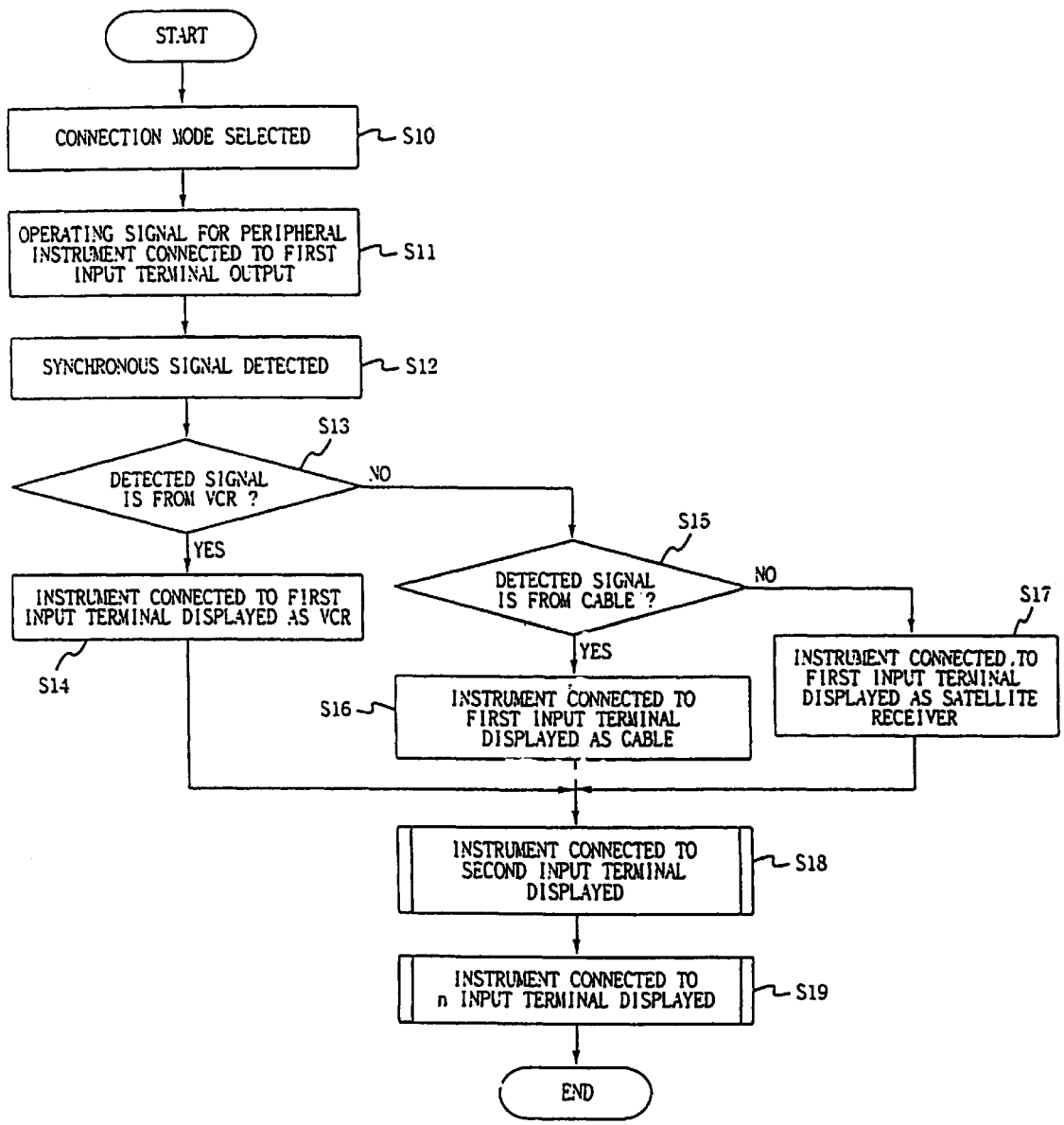
FIG. 4 is a flow chart illustrating a sequence of operation according to an embodiment of the present invention.

The operation of the peripheral units connection status display device having the above construction will now be described with reference to FIG. 4.

At step S10, a user selects a mode for displaying the connection status on a monitor by using a remote controller in order to determine whether a peripheral unit is connected to a television system. At step S11, system controller 44 outputs a control signal for operating the peripheral unit connected to the first input terminal of the television system for a predetermined time, and, at the same time selectively causes an output signal from the peripheral unit to be fed into switching unit 42, where it is directed to the system controller 44.

Subsequently, at step S12, the system controller 44 detects a synchronous signal from the signals input from the peripheral unit. At step S13, the system controller 44 determines whether the synchronous signal is the reproduced signal of a VCR.

As a result of the determination made at step S13, if the reproduced signal of a VCR is not detected, the procedure advances to step S15. At step S15, it is determined whether the synchronous signal is a cable signal output from a cable converter.

If it is determined, at step 15, that the synchronous signal is the cable signal, there is a graphic display indicating that cable broadcasting is connected to the first input terminal of the television system at step S16.

On the other hand, if it is determined ,at step 15, that the synchronous signal is not the cable signal, there is a graphic display indicating that a satellite receiver is connected to the first input terminal of the television system at step S17.

Since a determination as to what peripheral unit is connected to the first input terminal of the television system is made, the procedure advances to step S18.

At step S18 it is determined what peripheral unit is connected to the second input terminal of the television system, and once determined, it is displayed, and the operation proceeds to step S19. That is, by the manner described above, it is determined what peripheral unit is connected to the N input terminal of the television system, and once determined, it is displayed.

When the result of the determination at step S13, indicates the synchronous signal is the reproduced signal of a VCR, there is graphic display indicating that a VCR is connected to the first input terminal of the television system at step S14.

While the present invention has been particularly shown and described with reference to the particular embodiment thereof, it will be understood by those skilled in the art that various changes in form and details may be effected therein without departing from the spirit and scope of the invention as defined by the appended claims.

What is claimed is:

1. A peripheral unit connection status display device in a composite video apparatus, comprising:

a system controller for outputting a first control signal to operate peripheral units when a user selects a mode for displaying the connection status of the peripheral units and, for outputting a second control signal to generate a character according to a determination result about what peripheral units are connected to a television system;

a switching unit coupled to the system controller and the peripheral units for selecting a signal among various signals output from the peripheral units connected to the television system in response to the first control signal from the system controller; and an on screen display (OSD) generating unit coupled to the system controller and a video display device for displaying the connection status of the peripheral units to the television system in response to said second control signal.

2. The peripheral unit connection status display device as claimed in claim 1, further comprising transmitting means coupled to said system controller for transmitting said first control signal to the peripheral units.

3. The peripheral unit connection status display device as claimed in claim 2, wherein said transmitting means comprises an infrared transmitter.

4. The peripheral unit connection status display device as claimed in claim 1, wherein said selected signal comprises a synchronous signal output from a peripheral unit.

5. A method for displaying peripheral unit connection status in a composite video apparatus comprising the steps of:

operating a peripheral unit connected to a television system for a predetermined time when a mode for displaying the connection status is selected;

selecting a signal output from the peripheral unit;

determining whether the peripheral unit is connected to the television system by detecting a synchronous signal among signals output from the peripheral unit; and displaying a graphic indicating that the peripheral unit is connected to the television system on a monitor.

6. The method as claimed in claim 5, wherein said step of operating comprises the step of transmitting a control signal to the peripheral unit.

7. The method as claimed in claim 6, wherein said step of transmitting is performed using infrared transmissions.

* * * * *